C. H. NORTON & A. TURNER.
MULTIPLE SPEED DEVICE.
APPLICATION FILED SEPT. 27, 1917.

1,299,765.

Patented Apr. 8, 1919.

Witnesses
Lewis F. Butterfield
N. O. Hayward

INVENTORS
CHARLES H. NORTON
& ALBERT TURNER
BY
Clayton L. Jenks
ATTORNEY

UNITED STATES PATENT OFFICE.

CHARLES H. NORTON AND ALBERT TURNER, OF WORCESTER, MASSACHUSETTS, ASSIGNORS TO NORTON GRINDING COMPANY, A CORPORATION OF MASSACHUSETTS.

MULTIPLE-SPEED DEVICE.

1,299,765.  Specification of Letters Patent.  Patented Apr. 8, 1919.

Application filed September 27, 1917. Serial No. 193,600.

*To all whom it may concern:*

Be it known that we, CHARLES H. NORTON and ALBERT TURNER, citizens of the United States of America, residing at Worcester, in the county of Worcester and State of Massachusetts, have invented certain new and useful Improvements in Multiple-Speed Devices, of which the following is a full, clear, and exact specification.

Our invention relates to multiple speed devices and more particularly to differential gear reduction mechanism specifically designed as a means to move a heavy object at either of two rates of motion, the slower movement being adapted for moving an object at a uniform rate and for finally positioning it in a desired location.

In the art of grinding a cylindrical or a plane surface, for example, it is generally advisable to mount the work on a table which is movable longitudinally of the machine past the grinding wheel, and to provide a gear mechanism for adjusting the position of the table. To true the grinding wheel, a diamond or other cutting tool is mounted on the table for movement across the face of the wheel, and for fine grinding operations it is essential that the tool be moved accurately at a slow and uniform rate of motion. It furthermore may be necessary to adjust the work relative to the grinding wheel with precision beyond that obtainable with ordinary table operating mechanism.

It therefore is an object of our invention to provide a two-speed differential gear reduction mechanism for fine motions or for a direct drive, utilizable to move an object, such as a grinding table, at a fast rate for coarse adjustments of position or at a slow and uniform rate suitable for producing accurate and precise results even when manually operated.

Another object is to provide a multiple speed mechanism for such purposes having but a single driving member, and to provide a device for obtaining the different speeds by the simple act of manually starting the movement of a clutch member which then acts positively and automatically to connect the driving member with the reduction gearing or directly with the driven member, as desired.

It is a further object of our invention to provide a simply constructed, easily manipulated, compact, highly geared mechanism having a minimum of friction, which involves internally geared members and eccentrically mounted driving pinions, and thereby obtain a maximum of leverage and power for a given amount of space occupied by the parts, as compared with a differential gearing comprising pinions meshing with externally geared wheels.

With these and other objects in view, as will appear from the following disclosure, our invention resides in the combination of parts set forth in the specification and covered by the claims appended thereto.

Reference being had to the accompanying drawings in which like numerals indicate like parts, Figure 1 is a central vertical section of one type of device embodying our invention, showing the clutch in position for a direct drive;

Figure 3:
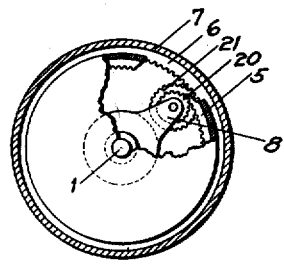
Fig. 3 is a section on line 3—3 of Fig. 1, looking from the rear, parts being broken away to show the pinions and internal gear teeth.

As a specific type of mechanism embodying one phase of our invention, applicable for moving a work table on grinding machinery, we have provided two internal gears in axial alinement, one fixed and the other rotatable, two pinions rotatably and revolubly mounted within the gears to mesh therewith, a clutch mechanism to connect or disconnect the pinions and a driving member to revolve the pinions about the axis of the gears.

Referring to the figures, we have shown a driven shaft 1, suitably mounted to rotate in bearings, as diagrammatically illustrated, in support 2 and actuated through intermediate gearing by a driving member, such as the manually operated hand wheel 3, rotatably mounted on a reduced portion of the shaft 1, and held in place by any suitable means, such as a collar or washer 4 fixed to the shaft. The gearing may comprise an internally geared wheel 5 concentric with and keyed to the shaft 1 to rotate therewith and a fixed annular internal gear rim 6 mounted on a cylindrical holder 7 bolted to the support 2, the axes of the two internal gear members being in alinement.

Two projecting arms 8 and 9 on the hand wheel 3 serve as bearing supports for a small pinion shaft 10, one end of which is rotatably and non-slidably mounted in arm 8. The arm 9 may constitute one of the radial spokes of the hand wheel, and in this form has a bearing block 11 fastened thereto, the block being centrally apertured, to carry a rotatable, longitudinally slidable quill or clutch collar 12 mounted therein. The forward end of shaft 10 is held in a centrally disposed bearing socket 13 within the quill clutch member, the socket 13 being sufficiently deep to permit longitudinal movement of the quill on the shaft. Relative rotation of quill and shaft is prevented by keying the parts together, as by means of a feather 14 fixed in the shaft and coöperating with a long groove 15 on the internal wall of the quill.

A pinion 20 rigidly connected to shaft 10, and here shown as integral therewith, and a pinion 21 rotatably mounted on shaft 10 continuously mesh with the movable and the fixed internal gears 5 and 6 respectively, to revolve eccentrically about shaft 1 and the axes of the internal gears, these parts being suitably constructed to perform the functions desired. The adjacent faces of pinion 21 and an annular flange 22 on quill 12 are provided with preferably fine clutch teeth 23 and 24, which are adapted to engage each other readily and securely to connect the pinions and cause them to rotate in synchronism, it being noted that the quill or clutch member 12 and pinion 20 are non-rotatively fixed on shaft 10. On the front side of the flange 22 is another set of teeth 25 adapted to coöperate with teeth 26 on the inner face of the bearing block 11 surrounding the slidable quill and connect the quill and the pinion 20 rigidly and non-rotatively with the hand wheel. As illustrated, clearance for flange 22 is provided by making a large aperture 27 in the arm 9, the longitudinal movement of the quill being determined by engagement of the clutch teeth.

In order that the slidable clutch member may be easily manipulated and automatically held in either of its operative positions, we may utilize a special feature of our invention, comprising spring pressed plungers 30 slidably mounted in the bearing block 11 and engaging one or the other of two parallel, annular, external grooves 31 and 32 on the quill. There are provided preferably two plungers mounted to engage the groove on diametrically opposite sides of the quill 12, this arrangement minimizing friction and strains between shaft 10 and its bearings. Each plunger may have a head 33 on its inner end, which is forced inwardly by means of an expansion spring 34 engaging the inner surface of an annular bolt 35 surrounding the plunger and threaded into the aperture 36 provided in the bearing 11 for this purpose. A handle 37 on the outer end of the quill serves for manual manipulation of the clutch. In order that there may be no neutral position for the clutch and to insure automatic engagement of clutch teeth if the operator moves the quill only a part of the necessary distance, we provide an annular wedge-shaped ridge 38 between the grooves 31 and 32. The slope of the ridge is such that the plungers may ride up one surface, when the quill is moved, and then passing over the ridge, automatically travel completely to the bottom of the groove, the springs being of sufficient strength to perform this operation. Hence the operator, to change the speed of the mechanism while turning the hand wheel, has but to strike the quill handle with the palm of his hand or similarly give it a quick pull, and the clutch teeth automatically seat in their new positions, this operation being materially aided by the fact that the clutch teeth are fine and can engage quickly for any position of the parts. It is obvious that shaft 1 may be connected with the object to be moved by any suitable mechanism and that the speeds obtainable herewith may be modified by gearing or other means, as desired.

The various gears and pinions are of such proportions and have such numbers of teeth as to produce a slow forward movement of the driven shaft 1 when hand wheel 3 is revolved. The ratio of the teeth on the gear 5 to those on the pinion 20 is made unequal to the ratio of the teeth on gear 6 to those on pinion 21, so that there is at least one more tooth on wheel 5 than required to permit pinion 20 to make the same number of rotations as does pinion 21 during a revolution of the fixed gear 6. As a specific example, we may employ 72 teeth on internal gear 6, 68 on the rotatable internal gear 5, 24 teeth on the pinion 21, and 20 teeth on pinion 20, thereby obtaining a forward movement of 8 teeth on gear 5 for each revolution of hand wheel 3.

Figure 1:
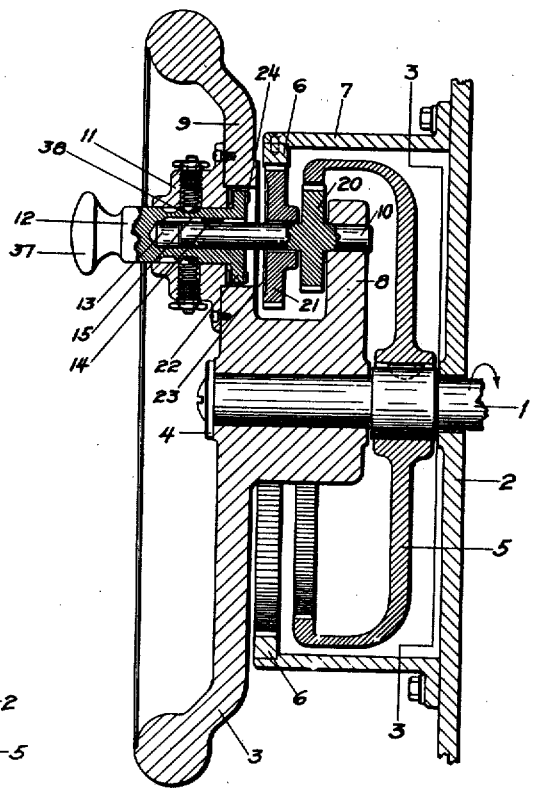
Figure 2:
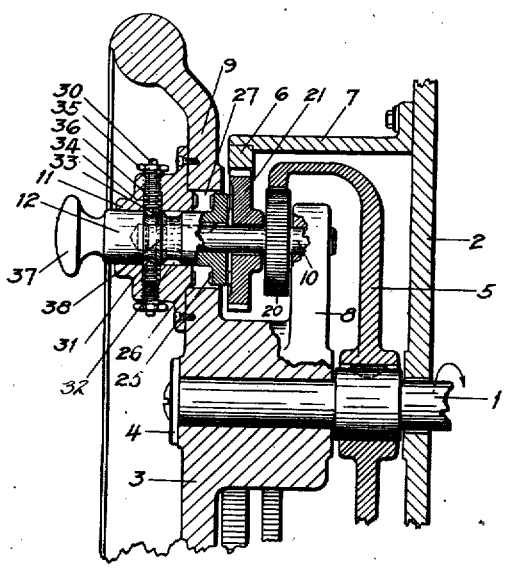
Fig. 2 is a similar view showing the parts positioned for a slow motion.
Figure 4:
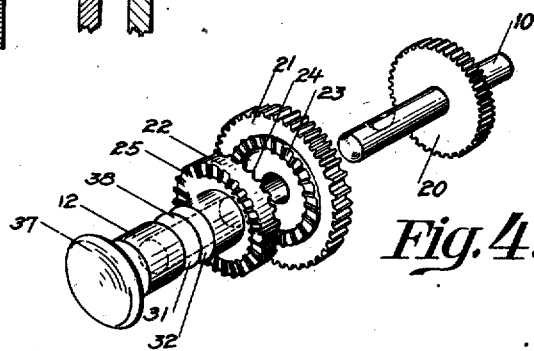
Fig. 4 is a detail in perspective of pinions, shaft and clutch quill in unassembled but relative positions.

The operation of the mechanism is as follows: To obtain a fast motion of shaft 1 for quick rough adjustments, the parts are positioned as shown in Fig. 1, the quill 12 being drawn to its outward limit of motion, so that clutch teeth 25 and 26 on the quill and bearing block 11 are in engagement and quill, shaft 10 and pinion 20 are fixed relative to the hand wheel. Hence movement of wheel 3 causes pinion 20 to revolve about the axis of shaft 1 without rotating in its bearings and drag the internal gear wheel 5 and shaft 1 with it, the pinion 21 idly rotating about its axis and in engagement with the fixed gear 6. When it is desired to change to a slow differential motion, the operator strikes quill 12, forcing it inwardly and placing clutch teeth 23 and 24 in position for engagement, as shown in Fig. 2, thereby causing pinions 20 and 21 to rotate in synchronism. Movement of hand wheel 3 revolves these pinions about axis 1, but pinion 21 meshing with the fixed rack 6 is thereby forced to rotate, turning pinion 20 with it, which in turn has to move the larger wheel 5 ahead during the revolution, and cause differential movement of the parts. By this mechanism we are enabled to move a body slowly and thereby obtain a fine adjustment of position or to produce manually a sufficiently uniform rate of motion for such accuracy of work as is required in truing a grinding wheel.

Having thus described our invention, what we claim as new and desire to secure by Letters Patent is:—

1. A multiple speed device comprising a fixed gear, a rotatable gear, a rotatable driving member, pinions revoluble about the axis of said member, one meshing with the fixed gear, the other with the rotatable gear, and means to cause the pinions to rotate synchronously or to lock the rotatable gear with its associated pinion only.

2. A multiple speed device comprising a rotatable gear, a fixed gear axially alined therewith, a driving member, rotatable pinions on said driving member revoluble about the axis of the gears and meshing therewith, said gears and pinions being adapted to produce differential movement, and a clutch mechanism adapted to lock the pinions together for rotating synchronously and driving the rotatable gear at a slow speed or to lock the rotatable gear with its coöperating pinion only, for a direct drive.

3. In a multiple speed device, a driven shaft, a rotatable driving wheel, differential gear mechanism, comprising a member rotatable with the shaft, and clutch mechanism on the wheel adapted to connect said wheel with the gear mechanism for rotating the shaft at a slow rate or to connect the wheel rigidly with said member for a direct drive.

4. A multiple speed device comprising a fixed internal gear, a rotatable internal gear, a driving member, a pinion rotatably meshing with each gear, and means to connect the rotatable gear and driving member for a direct drive or to connect said pinions intermediate the driving member and the rotatable internal gear and move the latter at a slow rate.

5. A gear mechanism comprising a rotatable internal gear, a pinion meshing therewith, a fixed internal gear, a second pinion meshing with it, each of said pinions being rotatably, eccentrically and revolubly mounted relative to the axis of rotation of its corresponding gear, and means to revolve said pinions simultaneously and in mesh with said gears.

6. A gear mechanism comprising a rotatable internal gear, a pinion meshing therewith, a fixed internal gear, a second pinion meshing with it, each of said pinions being rotatably, eccentrically and revolubly mounted relative to the axis of rotation of its corresponding gear, and means to drive said pinions synchronously and revolubly about said gears, the teeth on the gears and pinions being structurally and numerically adapted to cause differential movement thereof.

7. A gear mechanism comprising a fixed internal gear, a rotatable internal gear, pinions meshing with the gears, said gears and pinions being adapted for differential movement, means to rotate said pinions synchronously and revolve them about the axis of the gears and thereby produce a differential movement of the latter and means to produce a direct drive of the rotatable gear.

8. A gear mechanism comprising a fixed and a rotatable internal gear in axial alinement, rotatable pinions eccentrically mounted relative to said gears to revolve in mesh therewith and to rotate independently of each other, the ratio of the teeth on the gears not being in proportion to the ratio of teeth on the pinions respectively meshing therewith and means to lock said pinions together for synchronous rotation and to cause revolution of the pinions about the gears and produce differential movement thereof and means to drive the rotatable internal gear directly.

9. A gear mechanism comprising a shaft, a rotatable internal gear thereon and a fixed internal gear having a common axis, a driving member mounted on the shaft to rotate about said axis, pinions rotatably carried by said member and operatively and revolubly meshing with the internal gears, and means to connect relatively immovably the driving member, the pinion engaging the rotatable internal gear and said internal gear and to cause a direct drive of the shaft by rotation of the driving member or to connect said pinions together for synchronous rotation on the internal gears and about their axes on the driving member, the teeth on the gears and pinions being structurally and numerically adapted to cause a differential movement and consequent rotation of the rotatable internal gear.

10. A gear mechanism comprising a rotatably driven internally geared wheel, a rotatable driving member and a stationary internal gear axially alined with said wheel, pinions eccentrically and rotatably mounted on said driving member to revolve in mesh with the internal gears and means including a clutch to connect the rotatable pinions or to connect said driving member directly with said wheel, said internal gear wheel and pinions having their teeth numerically adapted to produce a differential movement when the pinions are connected and revolved about the gears.

11. A gear mechanism comprising a rotatable gear, a fixed gear axially alined therewith, a driver mounted to rotate about the axis of the gears, a pinion shaft eccentrically mounted on the driver, pinions on said shaft in mesh with the gears, and means, including a clutch collar slidably keyed on the pinion shaft, to connect the pinions for simultaneous rotation as they are revolved by the driver and cause a differential movement of the gears or to disconnect the pinions and drive the rotatable gear directly.

12. A gear mechanism comprising a driven shaft, a gear rotatable therewith, a fixed gear axially alined with the shaft, a rotatable driver, two pinions meshing with the gears, a pinion shaft therefor mounted on the driver to revolve about the axis of the gears, one of the pinions being keyed to the shaft and the other rotatably mounted thereon, the teeth on the gears and pinions being numerically adapted to produce a differential movement, and means, including a clutch collar on the pinion shaft adapted to engage the loose pinion, to lock the pinions together for synchronous rotation and slow movement of the driven shaft or to engage the driver and lock the rotatable gear to its pinion and permit the other pinion to rotate idly, for a direct drive.

13. A gear mechanism comprising a shaft, an internal gear rotatable therewith, a fixed internal gear axially alined with the rotatable gear, a driver rotatably mounted on the shaft, a pinion shaft eccentrically carried by the driver, a pinion fixed on said pinion shaft and meshing with one gear, a second pinion loose on the shaft meshing with the other gear, the teeth on the gears and pinions being numerically arranged to cause a differential movement of the gears, a clutch collar keyed to the pinion shaft and adapted to engage the loosely mounted pinion and cause the two pinions to rotate simultaneously and produce a differential movement of the gears or to engage the driver and lock the rotatable gear to its pinion and cause a direct drive of the shaft and means to hold the collar in either operating position.

14. A gear mechanism comprising a driven shaft, a driving member rotatably mounted thereon, an internal gear fixed on the shaft to rotate therewith, a stationary internal gear having its axis concentric with the shaft, a rotatable pinion shaft eccentrically mounted on the driving member, a pinion fixed to said shaft in mesh with the rotatable gear, a pinion rotatably mounted on the pinion shaft in mesh with the stationary gear and a longitudinally slidable double clutch keyed on said pinion shaft intermediate the rotatable pinion and the driving member, one face of the clutch being adapted to engage the driving member to connect it and the pinion shaft fixedly to give a direct drive, the other face of said clutch being adapted to engage said rotatable pinion and connect the pinions together for synchronous rotation relative to the driving member and around the internal gears, the ratio of the teeth on the pinions meshing therewith being such as to cause a differential movement of the internal gears upon rotation of the pinions.

Signed at Worcester, Massachusetts, this 25th day of September, 1917.

CHARLES H. NORTON.
ALBERT TURNER.

It is hereby certified that in Letters Patent No. 1,299,765, granted April 8, 1919, upon the application of Charles H. Norton and Albert Turner, of Worcester, Massachusetts, for an improvement in "Multiple-Speed Devices," an error appears in the printed specification requiring correction as follows: Page 1, line 16, for the word "finally" read *finely;* and that the said Letters Patent should be read with this correction therein that the same may conform to the record of the case in the Patent Office.

Signed and sealed this 29th day of April, A. D., 1919.

[SEAL.]

R. F. WHITEHEAD,

*Acting Commissioner of Patents.*

Cl. 74—34.